April 7, 1970 AKITO YANAI 3,505,502
PROCESS FOR CONVERTING TELEVISION VIEWING RECORDING TAPE
ON MINUTE BASIS TO ELECTRONIC COMPUTER INPUT TAPE
Filed April 7, 1966 2 Sheets-Sheet 1

INVENTOR.
Akito Yanai
BY
Attorney

INVENTOR
Akito Yanai

United States Patent Office 3,505,502
Patented Apr. 7, 1970

3,505,502

PROCESS FOR CONVERTING TELEVISION VIEWING RECORDING TAPE ON MINUTE BASIS TO ELECTRONIC COMPUTER INPUT TAPE

Akito Yanai, Tokyo, Japan, assignor to Kabushiki Kaisha Dentsu, Tokyo, Japan, a corporation of Japan Filed Apr. 7, 1966, Ser. No. 541,018
Claims priority, application Japan, May 28, 1965, 40/31,117
Int. Cl. G06k *1/00*
U.S. Cl. 235—61.1 5 Claims

ABSTRACT OF THE DISCLOSURE

Method of converting data indicating at one-minute intervals audience use of a television set at each such interval for a full week, into data on an input tape for an electronic computer, according to which in a data converter the one-minute data on the recording tape are converted into punched data on the input tape indicating only the changes in television viewing, including channels turned to and turn-off of the set, and the times of day when these changes occurred, with the data for one full day on many recorder tapes being converted into punched data on a single input tape, and successive days' data for a full week on many recorder tapes being converted into daily data on seven input tapes one for each day of the week.

The present invention relates, in general, to a process for reproducing and then compiling television audience research data recorded on tapes, and, in particular, to a process for first sorting recording tapes which are punched with holes to represent on a daily basis the channels being viewed by the television audience and then converting the daily tapes into data input tapes for electronic computers.

In general, recording tapes which are punched with holes at each television set which is supplied with a tape recording device to indicate the television channels to which the set is tuned, are perforated preferably at short time intervals, for example at one minute intervals, to ensure accuracy. As a result, an unusually long tape is required for an adequate test time, which is not suitable as an input data tape for an electronic computer for computing the results of the recording because such a long tape would require too much computer time.

It is an object of the present invention to provide a process for converting television audience viewing recording tape, which records at exemplary intervals of one minute, into data input tape for an electronic computer whereby relatively long recording tapes are compiled into shorter data input tapes. The data input tapes are much shorter than the recording tapes so as to decrease the expensive operating time of electronic computers, whereby to provide, in a very economical manner, the reproduction of various recordings and data so as to obtain audience viewing rates for various channels at various times of the day and night.

Other and further objects and advantages of the present invention will be readily apparent to one skilled in the art from a consideration of the following specification taken in connection with the appended drawings.

In the drawings, which illustrate the best mode presently contemplated for carrying out the invention:

Figures 1, 2, 3:
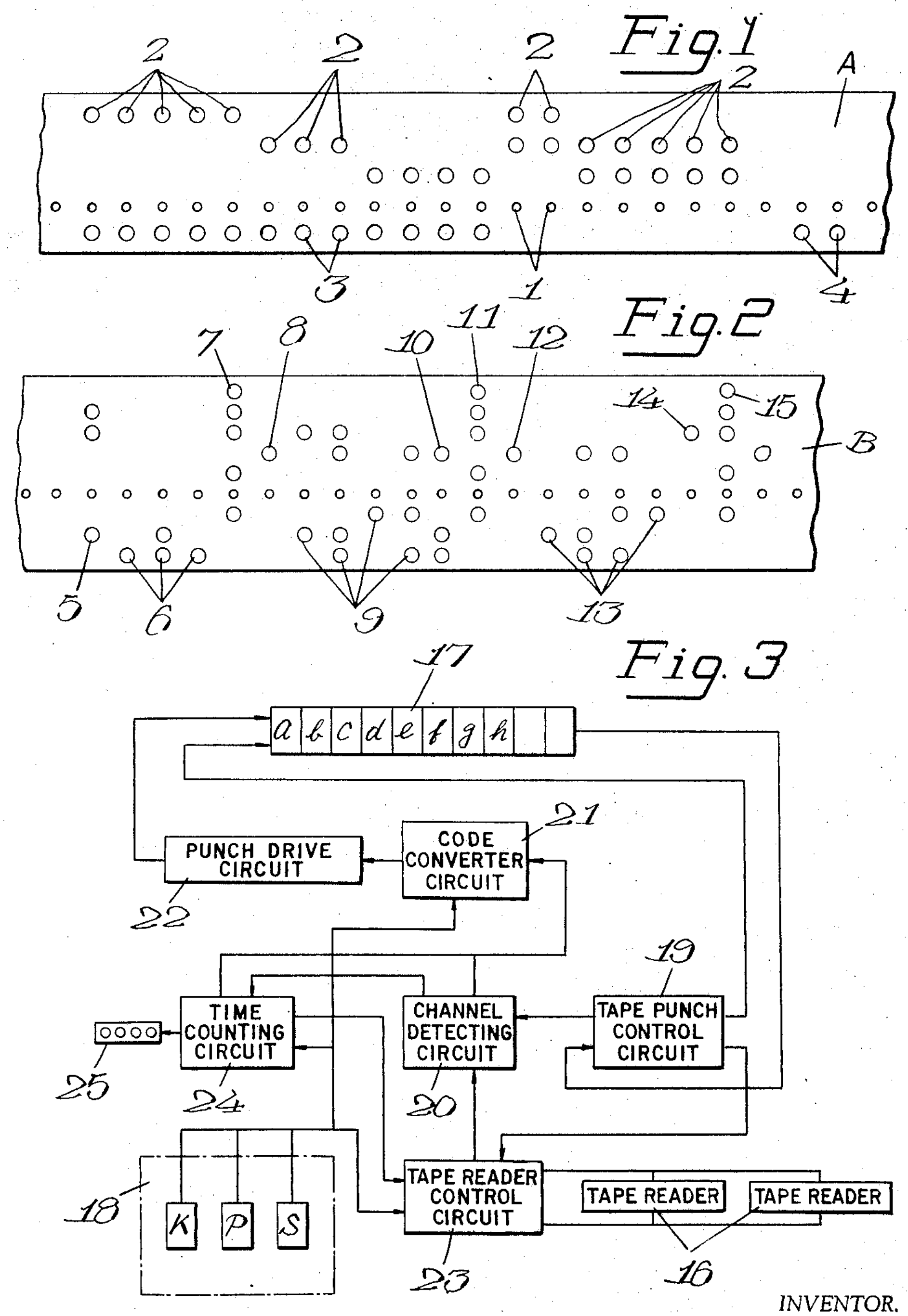
FIG. 1 is a plan view of a television channel audience viewing recording tape.
FIG. 2 is a plan view of a data input tape for an electronic computer.
FIG. 3 is a schematic block diagram of an automatic tape conversion system pursuant to the present invention.
Figure 4:
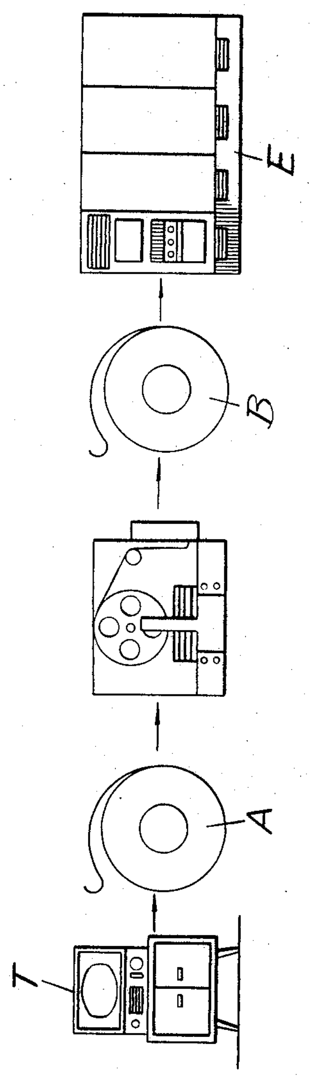
FIG. 4 is a diagrammatic illustration of a process for providing an audience viewing television research system pursuant to the present invention.
Figure 5:
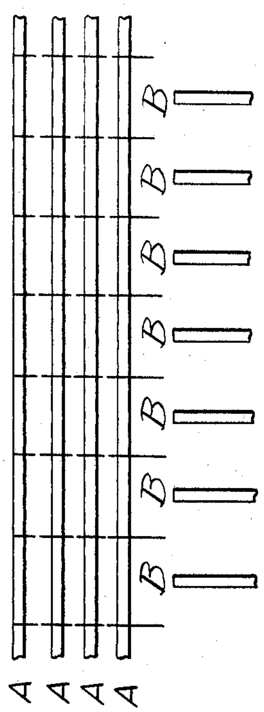
FIG. 5 is a schematic diagram which illustrates the conversion of television audience channel recording tapes into electronic computer data input tapes.

Referring now to FIG. 1 in detail, there is shown a recording tape A for recording the channels being viewed by a television viewer T (FIG. 4). The tape A records directly from the television set and is provided with feed holes 1 so as to be advanced at exemplary one minute intervals. Punched holes 2, 3 and 4 represent, respectively, channels to which the set is tuned, non-operation of the tuned television set i.e., no audience for the tuned set, and troubles in the tuned sets performance during each minute of recording of the tape. The differently grouped punched holes 2 indicate different channels to which the set is tuned, shown for simplicity of illustration as having been changed during few minutes intervals and even while the set is in indicated exemplary non-operation. If the set is not tuned to any channel, there will be no punched holes in the tape, and only the tape advance feed holes 1 will show. Troubles are indicated separately by the holes 4 in the absence of any corresponding channel holes. When the recording tape A is provided with punched start holes (not shown) to indicate the beginning of the period during which the audience research is to proceed, the tape will record the actual audience television tuning response for an exemplary period of one week or more due to the feed holes 1 which advance the tape at exemplary one minute intervals, there being to this end provided in the tape 1440 holes 1 for each full day.

Pursuant to the present invention, the television audience response recording tape A is converted into a data input tape B (FIG. 2) for an electronic computer E (FIG. 4). The input tape B for the electronic computer conventionally contains, besides initial start, sample number and end mark holes, basic groups of punched holes in a continuous sequence of eight digits or columns lengthwise of the tape. For example, hole 5 represents an initial start mark, holes 6 represent an initial sample number, holes 7 represent an initial end mark. These are followed in the exemplary tape shown by the first sequence of basic groups of punched holes, namely hole 8 as a space mark, holes 9 as a time mark, holes 10 as a channel mark, holes 11 as an end mark, and hole 12 as a space mark. These are followed by the next sequence, namely holes 13 as a time mark, hole 14 as a television channel mark, holes 15 as an end mark, and another hole as a space mark. The start mark 5 sample number 6 and end mark 7 are punched to identify the subsequent converted recording thereon of a particular recording tape A and, hence, are punched only once for this particular recording. The 8-hole columns from holes 8 to 12 denote the first basic group of punched holes. Among these holes, the space holes 8 and 12 are required by the computer to read the data therebetween, and end mark 11 is required by the computer to determine the end of the data which consists of the time mark 9 that denotes a particular time of day or night from 0 to 24 o'clock, for example 7:06 a.m., and the channel mark 10 which denotes a channel to which the set is tuned. Thus, the first 8-hole column from 8 to 12 will indicate in this example turn-on of a set to the indicated channel at 7:06 a.m. of a given day. The next 8-hole column will indicate that at the time denoted by the mark 13 the set has been turned to a different channel as indicated by the mark 14. The next 8-hole column (not shown) may indicate either a change-over to another channel at an indicated time or shut-off of the set at an indicated time. The repeating 8-hole columns thus signify the exact times when a set is on and when off and all channels viewed for the exact times, and the tape B may thus record the recordings in these respects not only of a multiplicity of different tapes A but also over a prolonged period such as 24 hours, for example.

The particular recording tape A is provided at the television receiver in a selected home and will record the actual channels being viewed by the same receiver during a period of one week or more. The data input tape B will sort the data recorded on each of many tapes A into daily units and will then sum them up for the sorted data of many households. The compiled data input tape will be fed directly to an electronic computer so that the data of a great many tapes A recorded in many hundreds of households will be processed in a simple manner by the electronic computer. In further detail, the recording tape A in each household advances at exemplary intervals of one minute during the recording period, whether or not the television set is in operation. Thus, it is advanced by 1440 feed holes 1 in one day, by 10,080 feed holes 1 in one week, and eventually by more than 5,000,000 feed holes for a total of 500 households. The input tape B will record changes in the viewing audience such as by the switching of channels. It will also record the lack of an audience for particular channels and also can record operating troubles in a television set. In addition, the input tape B can eliminate the repetition of punched holes during a period of time in which there is maintained the same audience viewing condition. As a result, much input tape can be eliminated and its length shortened so that there is a reduction in computer operating time.

The method, pursuant to the present invention, for converting recording tape A showing the viewing condition of the original television viewing audience, recorded at exemplary one minute intervals, to the data input tape for an electronic computer, is as follows.

The recording tape A is fed into two separate tape readers 16 (FIG. 3). The data input tape B is fed into ten sets of tape punches 17. The tape readers and the tape punches are operated by a keyboard 18 which is settable for a particular sample number assigned to the recorded tape A. The recording starting time is set up on the recording tape by punch buttons arranged in four vertical columns, whereupon the starting switch S on the keyboard is closed. Thereafter, pulses are generated by a tape punch control circuit 19. These pulses pass through a channel detecting circuit 20 and are coded by a diode matrix to correspond to bits of a start mark, previously provided in an eight bit code converter circuit 21. These pulses are fed into a punch drive circuit 22 and the output of the latter operates the first tape punch 17*a* to punch the start mark 5 on the eight bit tape. The sample number next to code has already been set up by the push button K or P on the key board 18, and the encoder has been formed by the closing of a contact point by the lowered push button. As a result, the pulses pass through the eight bit converter circuit 21 in the same manner as in the case of the start mark 5. The pulses operate the tape punch 17*a* to punch holes 6 in position next to the start mark 5. The end mark 7 and the space mark 8 prepared for the next coding operation are fed into the eight bit code converter circuit 21 through the diode matrix in the same manner as the start mark 5. As a result the punching operation on the input tape proceeds in the same manner as described for the start mark. After this introductory part has been punched in the tape B, a resulting signal is delivered to the tape reader 16 from the tape control circuit 19 and the tape reader 16 starts to operate through a tape reader control circuit 23. The recording tape A thus charged with records is by the feeding action of the tape reader moved and read at a high speed. The pulses due to the feed holes 1 of tape A are fed to a time counting circuit 24 through the tape reader control circuit 23. In this manner counting is started with 00:00 o'clock on a twenty-four hour basis and the actual time is shown exemplarily every minute on an indicator 25 until it shows the starting time punched in the recording tape. The starting time of the time counting circuit is previously set up on the keyboard 18.

When the recording tape A arrives with its data bits in reading position in the tape readers, the tape readers 16 stop. After this data has been read, the output pulses of the readers are fed to the channel detecting circuit 20 through the tape reader control circuit 23. The channel detecting circuit 20 detects which channel was received. Upon receiving the channel data and the time data when the readers are at rest, signals representative of the data are converted into eight bits by the code converter circuit 21 and punch an eight bits mark in four columns at the first punch set *a* of the tape puncher 17 through the punch drive circuit 22 in sequence in the order of the start mark 5, a sample number 6, and end mark 7, and space mark 8, which have been previously punched. There are then added in succession the time mark 9 and the audience channel mark 10.

After this punching has been completed, end mark 11 and space mark 12 are automatically punched in the input tape in that order through the tape control circuit 19, in the same manner as initial end and space marks. Thereafter, the tape reader control circuit senses the tape and against drives the tape reader 16 to read the recording tape A. Thereafter, only the feed holes 1 are counted up to a point of change in the audience channel (as for example, the point at which the television set tuning is changed from exemplary channel 1 to exemplary channel 4, or the point at which the switch is turned off), the feed hole count continuing to indicate the laps of time. Before arriving at the point on the tape where a change in channel occurred, the same operation is repeated including a repetition of the time mark 9 and the audience channel mark 10.

The foregoing description is chiefly concerned with the essential operations of compiling the audience reaction data and reproducing the recorded tape into data input tape for the computer. The operation hereinafter described includes the procedure in which the recording tape reaches the point denoting the time of 23.59 o'clock near the date line. Upon reaching said position, the time counting circuit 24 generates signals to control the tape punch drive circuit 22 to inactivate the tape punch *a* and to activate the second tape punch *b*. Thereafter, the second tape punch *b* produces another data input tape from the time of 00.00 o'clock of the next day. Every change in daily date will change the tape punch 17 correspondingly so that a recording tape prepared for one week will be divided and reproduced into seven input tapes B each prepared for one day. Consequently, numerous recording tapes for the same day are converted into seven input data tapes and compiled after they are punched in sequence. In other words, the input data tape represents the total sum of a plurality of recording tapes for the same day and the recording tapes for one week are summed up into seven tape groups of different dates. In this conversion process of the tape punches, the sample number established on the key board will be punched as a heading in the same manner as the prior tape punch.

In this manner seven tape punchers 17 of a total of ten tape punchers are assigned for each day of a week and the remaining tape punchers are reserved for the previous week or the following week to compensate for the failure to recover the recording tapes from each home. The two tape readers 16 operate continuously either by alternately charging or discharging the recording tape. The punched input data tape is provided with the start mark, the end mark and the space mark which are necessary for the electronic computer operation, and the sample number which represents a combination of columns and numbers of punches representing 000–999 in three columns widthwise of the tape. The time mark also indicates 00.00 o'clock to 23.59 o'clock by a combination of column and number punches. In this manner the number of hours of audience viewing can be read by the computer from the beginning to the end of the audience viewing time. The channel mark will indicate the particular channel being watched, among exemplary eight television broadcast channels, by columns of punches.

A device for recording the television audience viewing rate must be relatively small. In addition, it must automatically be tuned to a change in viewing channels without hindrance to the viewing audience and with utmost accuracy. It is not possible to have the television set in each home equipped with the apparatus for producing data input tapes for the electronic computer. Consequently, the present invention provides a method for collecting many recording tapes prepared in the recording equipment provided in each home and for totalizing said tapes and for compiling the totals into input tapes B of different dates for application to the electronic computer. In this manner, the operating time of the computer can be reduced so as to provide various data tabulations of audience viewing research in a very short time.

What is claimed is:

1. A method for converting television audience viewing recording tape on a predetermined time interval basis into input data tape for an electronic computer, which comprises feeding into tape readers a recording tape provided with holes punched at said predetermined time intervals for indicating tuned channels and non-operation of the tuned television set, respectively; feeding the input data tape into a tape puncher provided with a plurality of punches; setting a start mark, a sample number, an end mark and a space mark on a key board and setting push buttons for the record starting time of the recording tape in four data bits; punching into the input tape a start mark, a sample number, and end and space marks as the first data bits of the input tape; receiving punch end signals from a tape punch control circuit and utilizing a tape reader control circuit to start the tape reader; punching a time mark and a channel mark on the input tape with the tape punch by signals from a channel detecting circuit and a time counting circuit in response to the data on the recording tape after the recording tape arrives in the tape readers at the position of the data bits, and repeating said operation until the recording tape arrives at the position of a date change; and utilizing a signal from a time counting circuit to change the tape punch drive circuit to another tape punch, whereby a recording tape for one week is changed into seven input tapes each for one day for an electronic computer.

2. The method set forth in claim 1, wherein the recording tape is applied to a pair of tape readers.

3. The method as set forth in claim 1, wherein the input tape is fed into a tape puncher having more than seven tape punches.

4. The method as set forth in claim 1, wherein the holes punched into the recording tape are grouped into pluralities of hole punches and localized at predetermined positions to indicate different data information.

5. The method as set forth in claim 1, in which the recording tape is also provided with holes for indicating troubles of the television set for their recording on the input data tape.

References Cited

UNITED STATES PATENTS 2,803,402 8/1957 Rabenda et al. ------ 235—61.1
3,070,798 12/1962 Currey et al.

DARYL W. COOK, Primary Examiner

T. J. SLOYAN, Assistant Examiner